United States Patent
Bauman

[11] 3,779,428
[45] Dec. 18, 1973

[54] SEED CONTROL GATE FOR PLANTERS
[75] Inventor: Jack L. Bauman, Naperville, Ill.
[73] Assignee: International Harvester Company, Chicago, Ill.
[22] Filed: July 13, 1971
[21] Appl. No.: 162,090

[52] U.S. Cl.............. 222/498, 222/517, 251/75, 251/303
[51] Int. Cl. .............. F16k 1/20, F16k 31/56
[58] Field of Search............ 222/517, 556, 498; 251/75, 303

[56] References Cited
UNITED STATES PATENTS

| | | | |
|---|---|---|---|
| 1,157,709 | 10/1915 | Maher | 222/556 X |
| 1,502,842 | 7/1924 | Beiswenger | 251/75 X |
| 3,589,562 | 6/1971 | Buck | 222/498 X |
| 1,304,519 | 5/1919 | Walker | 251/303 X |
| 2,150,753 | 3/1939 | Weinstein | 222/577 |
| 3,272,399 | 9/1966 | Dight | 222/517 X |

Primary Examiner—Robert B. Reeves
Assistant Examiner—Frederick R. Handren
Attorney—Floyd B. Harman

[57] ABSTRACT

A seed dispenser for planters in which seed is fed by gravity from a hopper through a seed delivery chute to a device which meters the seed and discharges it to the planter furrow openers. A control gate is mounted in the seed chute and is movable from an open to a closed position to shut off the flow of seed to the metering device.

9 Claims, 8 Drawing Figures

PATENTED DEC 18 1973 3,779,428
SHEET 1 OF 2
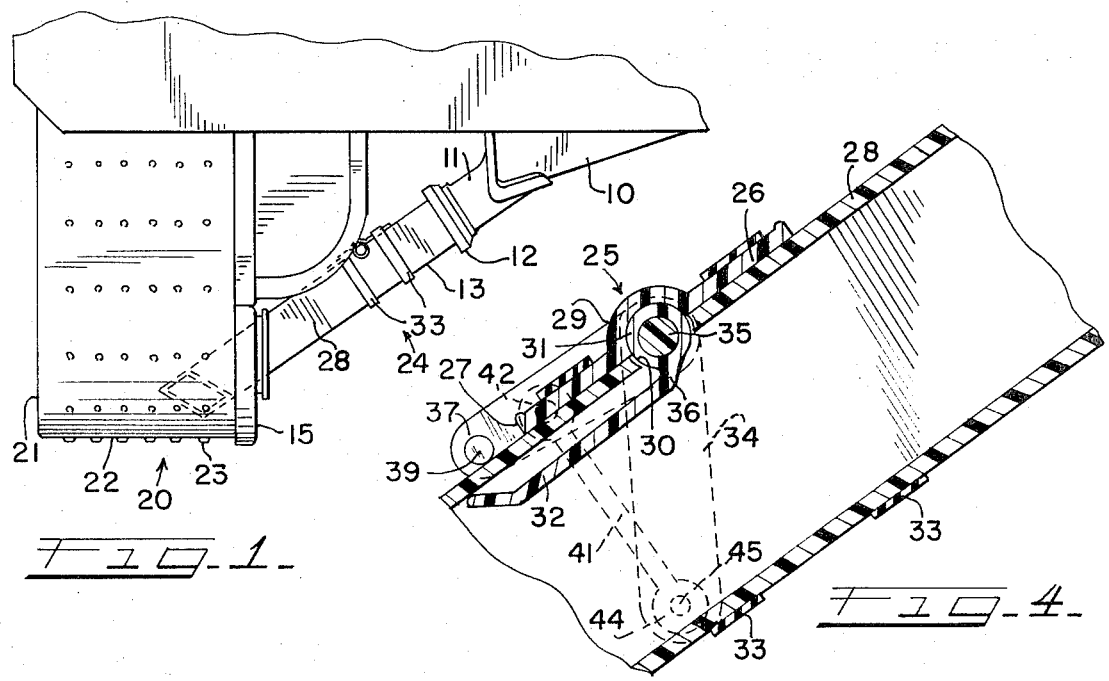
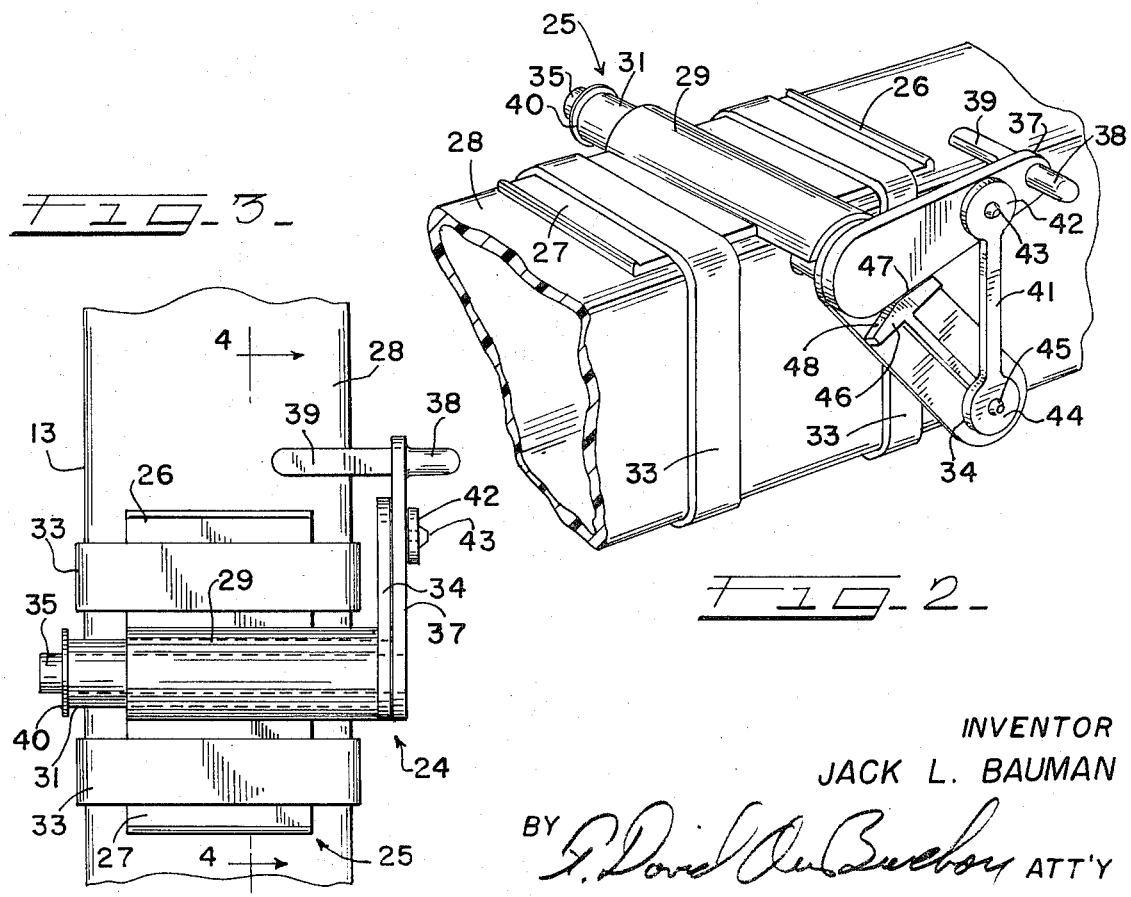
INVENTOR
JACK L. BAUMAN
BY *[signature]* ATT'Y

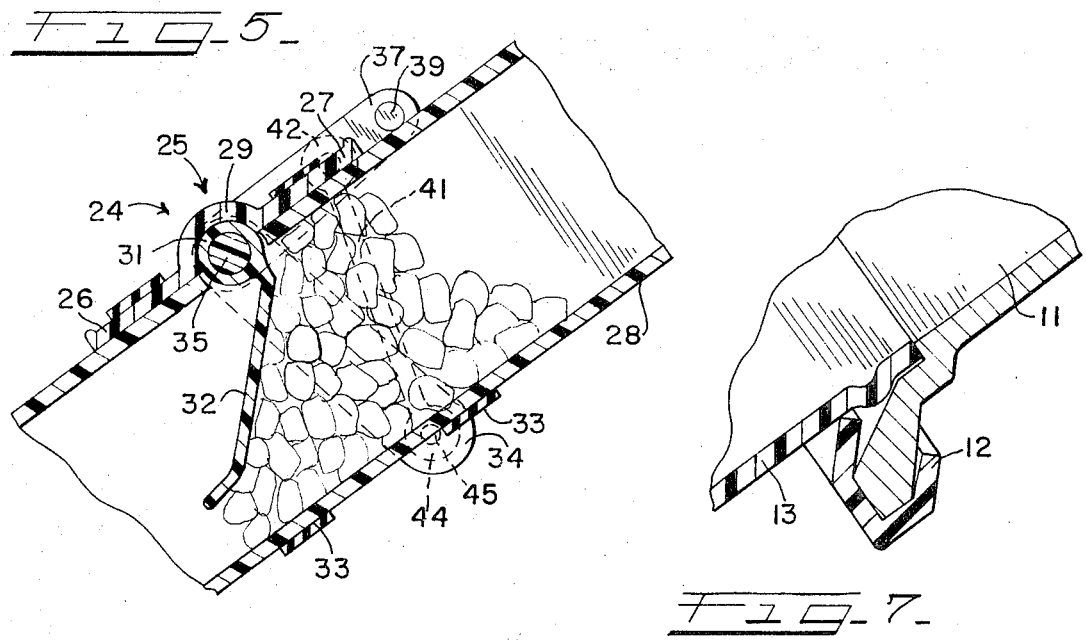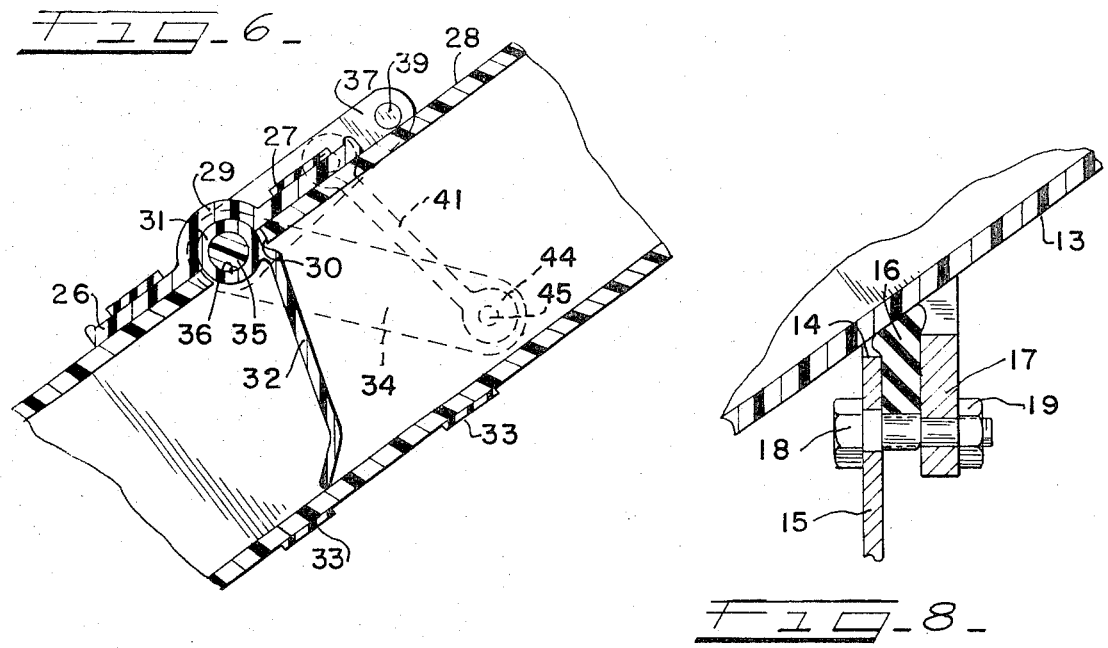

SEED CONTROL GATE FOR PLANTERS

CROSS REFERENCES TO RELATED APPLICATIONS

U.S. Pat. to Loesch et al., No. 3,637,108 of Jan. 25, 1972, U.S. Application to Lienemann et al., Ser. No. 146,258, filed May 24, 1971, U.S. Application to Lienemann et al., Ser. No. 169,960, filed Aug. 9, 1971, and U.S. Application to Bauman et al., Ser. No. 162,091, filed July 13, 1971.

BACKGROUND OF THE INVENTION

1. Field of the Invention

This invention relates to material dispensers and particularly to planters. More specifically, the invention concerns a delivery chute for feeding seed from a hopper to a metering device and closure means mounted in the chute for shutting off the flow of seed from the hopper.

2. Description of the Prior Art:

In conventional planters in common use, such as seed plate planters, seed is metered by a revolving seed plate as it leaves the hopper, and in grain drills and the like, fluted feed cups rotatably mounted in the bottom of the hopper discharge measured quantities of seed only as long as the metering devices are revolved. To shut off the flow of seed from either type of planter it is necessary only to discontinue driving the rotatable plates or feed cups.

SUMMARY OF THE INVENTION

In the type of planter with which this invention is particularly concerned, seed metering is achieved by a rotatable seed selector drum having peripheral seed-receiving openings. Seed is fed to the drum by gravity from a hopper through a seed delivery chute to form a seed supply in the bottom of the drum from which seed is picked up by the peripheral openings during rotation of the drum. Air under pressure supplied to the drum retains the seed in the openings and carries it to an area from which it is ejected from the drum and guided to the furrows formed by the planter furrow openers. The openings formed in the periphery of a particular drum are designed to seat and retain seed of a certain size and variety, such as corn. To plant a different crop, for example soy beans or peanuts, a different drum is required having seed-receiving openings designed to fit the new seed. When the drum is removed for replacement, seed remaining in the hopper continues to flow through the seed chute, and the loss of a significant amount of seed is unavoidable in the absence of means for shutting off the flow of seed from the hopper.

Therefore, it is an object of this invention to provide means for interrupting the flow of seed between a hopper and a seed metering device.

Another object of the invention is to provide novel control gate mechanism in the seed delivery chute through which seed is fed from a seed hopper to the metering or seed selector device.

DESCRIPTION OF THE DRAWINGS

FIG. 1 is a view in side elevation of a portion of the seed dispensing apparatus with which this invention is associated;

FIG. 2 is a perspective view of a portion of the seed delivery chute having mounted therein the control gate of this invention;

FIG. 3 is an enlarged detail in plan, of a portion of the chute and the control gate mechanism;

FIG. 4 is a section taken on the line 4—4 of FIG. 3, showing the gate in its open position;

FIG. 5 is a sectional view similar to FIG. 4 showing the relationship of parts in an intermediate position of the control gate;

FIG. 6 is a view similar to FIGS. 4 and 5 showing the closed position of the control gate;

FIG. 7 is an enlarged sectional detail showing the connection of the seed delivery chute to the discharge spout of the hopper; and FIG. 8 is an enlarged sectional detail showing the connection of the seed delivery chute to the seed selector drum.

DESCRIPTION OF THE PREFERRED EMBODIMENT

In the drawings the numeral 10 designates a seed hopper having a bottom outlet to which is affixed a seed discharge spout 11, generally square in cross-section, having its outer end flared and provided with a sealing ring 12 of rubber or the like to detachably receive the upper end of a seed delivery chute 13, also generally square in cross-section, the lower end of which is received in an opening 14, indicated in FIG. 8, provided in a stationary wall 15, a sealing ring 16 surrounding the chute 13 being removably held in place by a clamping ring 17 secured to wall 15 by bolts 18 and nuts 19.

As indicated in FIG. 1, the open lower end of chute 13 projects into and discharges seed to the lower portion of a seed selector drum 20 which comprises an outer wall 21, and a peripheral portion 22 having seed-receiving openings 23 therein, and is rotatably mounted on stationary wall 15.

In drum 20 a seed supply is formed by the delivery thereto of seed discharged by gravity from the hopper 10 through seed chute 13, and it may be understood that from the drum the seed is ejected to the furrow openers of the planter with which this invention is associated. For details of the construction and operation of the seed selecting and ejecting means in the drum, which form no part of the invention as claimed herein, reference may be made to the copending U.S. Application to Loesch et al., referred to hereinbefore.

Seed discharged from the hopper substantially fills the chute 13 and the flow of seed is shut off, when desired, by the provision of control means mounted in the delivery chute 13 and generally designated by the numeral 24. The control means comprises a clamp member 25 having flanges 26 and 27 engaging the upper face 28 of the seed chute and flanking a central arch 29. The central arch 29 is in registry with a transverse opening in the form of a slot 30 formed in the upper face 28 of the chute and has beveled edges forming with arch 29 a bearing to pivotally seat, in substantially air-tight relation, the cylindrical head portion 31 of a closure gate 32. Closure gate 32 extends into and conforms to the shape of the interior of the chute and is swingable about its pivot axis between the open and closed positions as shown respectively in FIGS. 4 and 6.

In assembling the control means the gate 32 is inserted into the opening 30 until the cylindrical head portion 31, the outer diameter of which is greater than the diameter of the opening, is seated therein. Clamp 25 is disposed as shown in FIGS. 3 to 6 with head 31 received in arch 29 and flanges 26 and 27 engaging the upper face 28 of the chute. Clamp 25 is secured in place by removable bands 33, of rubber or the like.

Formed integrally with gate 32 exteriorly of the chute is a lever 34, affixed to one end of the cylindrical head portion 31 of the gate perpendicular to the axis thereof and extending downwardly alongside the chute. Lever 34 forms external operating means swingable about the axis of the head portion 31 to move the gate between its open and closed positions.

Actuating means for opening and closing the gate includes a pivot pin 35 received in the hollow core 36 of head portion 31 and rotatable relative thereto. An arm 37 is formed integrally with one end of pivot pin 35 and lies outwardly of lever 34. Arm 37 is provided at its free end with an outwardly projecting handle member 38 and an inwardly projecting stop bar 39 engageable with the upper face 28 of the chute. A lock washer 40 holds the pivot pin 35 against axial displacement from the hollow head portion 31 of the gate.

At this point it should be clear that arm 37 is free to pivot through an arc of substantially 180° from the position of FIG. 4 to that of FIG. 6.

This swinging movement of arm 37 is transmitted to lever 34, and therefore to gate 32 to pivot the gate approximately 90° between open and closed positions by the provision of an elastic biasing member 41, preferably of resilient material such as rubber or the like having an enlarged upper end 42 apertured to receive a pin 43 projecting outwardly from arm 37, and an enlarged lower end 44 apertured to receive a pin 45 affixed to the outer end of lever 34.

In the gate-open position of FIG. 4, pin 43 is disposed on one side of a center line through pin 45 and the axis of pivot pin 35, and the bias in member 41 urges lever 34 and gate 32 in a clockwise direction, as viewed in FIG. 4, with the bent lower end of gate 32 adjacent the interior of the chute.

With seed flowing downwardly through the chute, in order to close the gate and shut off the flow of seed to drum 20, the operator grasps handle 38 of arm 37 and swings the latter through its arc of travel against the bias in member 41, clockwise, as viewed in FIG. 4. The bias of member 41 opposes this movement until the pin 43 at the upper end of member 41 passes overcenter with respect to the line through pin 45 and the axis of pivot pin 35. Beyond this point the bias of member 41 pulls pin 43 to the position of FIGS. 5 and 6 with stop bar 39 again engaging the upper face 28 of the chute.

With arm 37 in the position of FIGS. 5 and 6, member 41 has been stretched and exerts its maximum force on lever 34 and gate 32 to close the latter. The bias in member 41 now urges lever 34 and gate 32 counterclockwise through the intermediate position of FIG. 5, with the force exerted by member 41 diminishing as the seed flow diminishes, until the lower end of the gate 32 is in the fully closed position of FIG. 6. The closing movement of the gate being limited by the provision of a stop member 46 affixed to lever 34 and having relatively angled surfaces 47 and 48. The former being engageable with arm 37 in the open position of the gate, as shown in FIG. 2, and the latter being engageable with arm 37 upon swinging the latter and lever 34 to the closed position of the gate shown in FIG. 6.

To again open the gate, arm 37 is swung counterclockwise, as viewed in FIG. 6, and overcenter with respect to the gate axis until stop bar 39 again engages the top of the chute, the bias in the stretched resilient member 41 returning the gate to the open position of FIG. 4.

Under normal operating conditions, rotation of the seed selector drum is not discontinued when the planter is turned at the ends of the field. However, when it is desired to exchange the drum for another one adapted to meter a different kind and size of seed, while seed remains in the hopper, rotation of the drum is discontinued and the gate in the seed chute is closed to avoid loss of seed. Upon removal of the drum, the gate is again opened and a bag is placed under the discharge outlet of the chute to collect the seed until the hopper is empty. Upon replacing the drum and refilling the hopper with the selected seed the gate is again opened and seed delivered to the drum. When the seed supply in the bottom of the drum reaches a level above the discharge outlet of the chute in the drum, seed will no longer feed to the drum until operation of the planter and ejection of seed from the drum lowers the seed supply to a normal operating level.

It should also be noted that, as occurs in conventional planters, the seed metering mechanism, in this case the drum 20, is driven from one of the ground engaging wheels of the planter, and suitable clutch means, well known in the art, is provided and is operable when the planter is raised for transport to disconnect the drum drive. Thus, when the planter is to be driven on highways or the like with seed in the hopper, closure of the gate is not required since the drum drive was disconnected when the planter was raised for transport, and again, when the seed supply in the bottom of the drum reaches a predetermined level, further delivery of seed from the hopper to the drum is blocked by the seed level in the drum.

What is claimed is:

1. In a delivery chute for a material dispenser, said chute being generally square in cross-section and having a transverse opening formed in one wall thereof, a control gate mounted in the chute for pivoting on a transverse axis, said gate having a cylindrical head portion pivotally seated in said opening, said opening being at least as wide as the gate to accommodate insertion in and withdrawl of the gate from said opening, and actuating means for pivoting the gate between open and closed positions comprising, an arm pivotally mounted on the chute for swinging about a transverse axis, and an elastic member connected at one end to said arm and operatively connected at its other end to said gate, pivoting movement of said gate being influenced solely by said arm through said elastic member, the connection of the elastic member to said arm being movable overcenter with respect to a line through the pivot axis of said gate and said connection of its other end to bias the gate to said open and closed positions.;

2. The invention set forth in claim 1, wherein said head portion of the gate is hollow and the mounting of said arm on the chute comprises a pivot pin affixed to said arm and rotatably received in said hollow head portion.

3. The invention set forth in claim 2, wherein a lever is affixed to said head portion exteriorly of the chute and said other end of said elastic member is connected to said lever.

4. The invention set forth in claim 3, wherein the width of said opening is less than the outer diameter of said cylindrical head portion of the gate and wherein said invention further includes a clamping member removably secured to the chute having a semi-cylindrical bearing portion engaging and confining said head portion in said opening.

5. The invention set forth in claim 4, wherein said arm is swingable substantially 180° from one side of the pivot axis of said gate to the other and a stop member carried by said arm is engageable with the chute in both positions of the arm.

6. The invention set forth in claim 5, wherein another stop member is affixed to said lever and is engageable with said arm in each of the positions of the latter to limit the swinging of said gate to approximately 90° between its open and closed positions.

7. In a material dispenser for seed and the like; a hopper, a chute connected to the hopper for discharging material therefrom, said chute being generally square in cross-section and having an opening therein, a control gate mounted in the chute having a head portion pivotally receivable in said opening to accommodate swinging of the gate between open and closed positions, said opening being a slot extending transversely of the chute to accommodate insertion and withdrawal of the gate, the width of the slot being less than the diameter of said head portion to pivotally seat the latter therein, a lever integral with said head portion exteriorly of the chute and disposed in a plane parallel to the path of swinging movement of the gate, an actuating arm pivotally mounted on the chute and swingable between positions on opposite sides of the pivot axis of the gate, and a biasing member connected at one end to said lever and at its other end to said arm and having a bias to hold the gate in either of said positions, pivoting movement of said gate being influenced solely by said arm through said elastic member, said arm and the connection of said biasing member thereto being swingable overcenter with respect to a line through the axis of the gate and said connection of its other end to bias the gate to said open and closed positions.;

8. The invention set forth in claim 7, wherein clamping means are provided on the chute to confine said head portion of the gate in said opening and prevent displacement of the gate from the chute.

9. The invention set forth in claim 8, wherein said biasing member is elastic and is stretched throughout the arc of swinging movement of said arm to hold the gate in each of said positions thereof.

* * * * *